(12) United States Patent
Kyung

(10) Patent No.: US 11,314,404 B2
(45) Date of Patent: Apr. 26, 2022

(54) APPARATUS AND METHOD FOR PROVIDING SCREEN SETTING DATA OF PLURALITY OF DEVICES

(71) Applicant: Apposter Inc., Seoul (KR)

(72) Inventor: Sung Hyun Kyung, Seoul (KR)

(73) Assignee: Apposter Inc., Seoul (KR)

( * ) Notice: Subject to any disclaimer, the term of this patent is extended or adjusted under 35 U.S.C. 154(b) by 248 days.

(21) Appl. No.: 16/682,023

(22) Filed: Nov. 13, 2019

(65) Prior Publication Data
US 2021/0132780 A1 May 6, 2021

(30) Foreign Application Priority Data

Oct. 31, 2019 (KR) .................. 10-2019-0137808

(51) Int. Cl.
*G06F 3/048* (2013.01)
*G06F 3/04847* (2022.01)
*G06F 3/0486* (2013.01)
*G06F 3/14* (2006.01)

(52) U.S. Cl.
CPC ........ *G06F 3/04847* (2013.01); *G06F 3/0486* (2013.01); *G06F 3/1423* (2013.01)

(58) Field of Classification Search
CPC ... G06F 3/04847; G06F 3/0486; G06F 3/1423
See application file for complete search history.

(56) References Cited

U.S. PATENT DOCUMENTS 10,073,599 B2 * 9/2018 Khoury ............... G06F 3/04845

FOREIGN PATENT DOCUMENTS

KR          10-1438198 B1      9/2014
KR     10-2017-0132404 A    12/2017

OTHER PUBLICATIONS

An Office Action mailed by the Korean Intellectual Property Office dated Nov. 20, 2020, which corresponds to Korean Patent Application No. 10-2019-0137808 and is related to U.S. Appl. No. 16/682,023.

* cited by examiner

*Primary Examiner* — Haoshian Shih
(74) *Attorney, Agent, or Firm* — Studebaker & Brackett PC

(57) ABSTRACT

Provided are an apparatus and a method for providing screen setting data of a plurality of devices. The apparatus includes at least: a communication unit that transmits and receives data; a storage unit that stores the data; and a controller operatively connected to the communication unit and the storage unit. The controller receives screen configuration data determined by a manufacturer in association with a specific device selected by the manufacturer of a first user device from the first user device, stores screen setting data based on the received screen configuration data and screen characteristic data for a predetermined standard screen of the specific device in the storage unit, receives a screen setting request for the specific device from a second user device, and transmits screen setting data stored so as to correspond to the specific device in accordance with the screen setting request to the specific device.

6 Claims, 12 Drawing Sheets

REPLACEMENT SHEET
FIG. 2
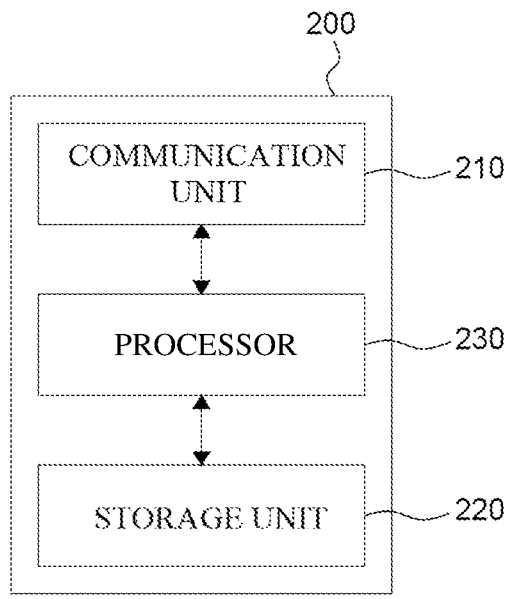

APPARATUS AND METHOD FOR PROVIDING SCREEN SETTING DATA OF PLURALITY OF DEVICES

CROSS-REFERENCE TO RELATED APPLICATIONS

This application claims the priority of Korean Patent Application No. 10-2019-0137808 filed on Oct. 31, 2019, in the Korean Intellectual Property Office, the disclosure of which is incorporated herein by reference.

BACKGROUND

Field

The present disclosure relates to an apparatus and a method for providing screen setting data of a plurality of devices.

Description of the Related Art

In accordance with the recent development of Internet, not only smart phones, but also various devices such as PCs, tablet PCs, smart TVs, vehicles, and advertisement screens display various information using the Internet. Manufacturing companies of the devices provide manufacturer's own user interfaces.

Specifically, every smart phone manufacturing company provides various screen designs so that a user may select any one of screen designs which are provided in advance by the smart phone manufacturing company.

However, since the screen design provided by the manufacturing company is set in advance by the manufacturing company, it is difficult to provide a screen design to which user's various preferences are reflected.

Accordingly, even though a service for sharing a smart phone screen which is directly designed by the user is provided, this service merely provides a smart phone screen designed by the user using a separate manufacturing program. However, a service which allows the user to design the smart phone screen and share the designed smart phone screen is not provided.

Therefore, it is inconvenient for the user to design the smart phone screen using a separate manufacturing program and share the screen design manufactured as described above using a separate sharing service.

Further, a service which allows a user to directly design and share a screen of a PC, a tablet PC, and a smart TV, an instrument panel screen of a vehicle, and an advertisement screen is not provided so that there is a problem in that various preferences of the users who possess the devices are not reflected.

Therefore, a method of allowing the user to directly and more conveniently design the screen of the devices to reflect the preference of the user who possesses a plurality of devices and share the design is demanded.

SUMMARY

An object of the present disclosure is to provide an apparatus and a method for providing screen setting data of a plurality of devices.

Specifically, an object of the present disclosure is to provide an apparatus and a method for providing screen setting data of a plurality of devices so as to provide a screen design to which various preferences of a user are reflected.

Further, another object of the present disclosure is to provide an apparatus and a method for providing screen setting data of a plurality of devices so as to allow a user to conveniently design a screen.

The objects of the present disclosure are not limited to the objects described above and other objects will be clearly understood by those skilled in the art from the following description.

In order to achieve the objects, there is provided an apparatus and method for providing screen setting data of a plurality of devices according to an embodiment of the present disclosure. An apparatus for providing screen setting data of a plurality of devices according to an embodiment of the present disclosure includes: a communication unit configured to transmit and receive data; a storage unit configured to store the data; and a processor configured to be operatively connected to the communication unit and the storage unit; wherein the processor is configured to receive screen configuration data determined by a manufacturer in association with a specific device selected by the manufacturer of a first user device from the first user device through the communication unit, store screen setting data based on the received screen configuration data and screen characteristic data for a predetermined standard screen of the specific device in the storage unit, receive a screen setting request for the specific device from a second user device, and transmit screen setting data stored so as to correspond to the specific device in accordance with the screen setting request to the specific device.

A method for providing screen setting data of a plurality of devices which is performed by a processor of the apparatus according to an embodiment of the present disclosure includes: receiving screen configuration data determined by a manufacturer in association with a specific device selected by the manufacturer of a first user device from the first user device; storing screen setting data based on the received screen configuration data and screen characteristic data for a predetermined standard screen of the specific device; receiving a screen setting request for the specific device from a second user device; and transmitting screen setting data stored so as to correspond to the specific device in accordance with the screen setting request to the specific device.

Other detailed matters of the exemplary embodiment are included in the detailed description and the drawings.

According to the present disclosure, a screen design of a plurality of devices to which various preferences of a manufacturer are reflected may be provided.

Further, according to the present disclosure, the manufacturer may design the screen of each device and share the screen design.

Further, according to the present disclosure, inconvenience of the manufacturer which needs to select a size, a shape and/or a resolution of a display panel in accordance with a model of a specific device may be reduced.

According to the present disclosure, inconvenience of the manufacturer which needs to separately generate screen configuration data associated with a different model or a different type from that of a specific device after generating screen configuration data for the specific device may be reduced.

According to the present disclosure, a time and resources consumed to configure the screen may be minimized and the convenience of screen configuration may be increased.

The effects of the present disclosure are not limited to those described above and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which:

FIG. 2 is a schematic view for a service providing apparatus according to an embodiment of the present disclosure;

DETAILED DESCRIPTION OF THE EMBODIMENT

Figure 1:
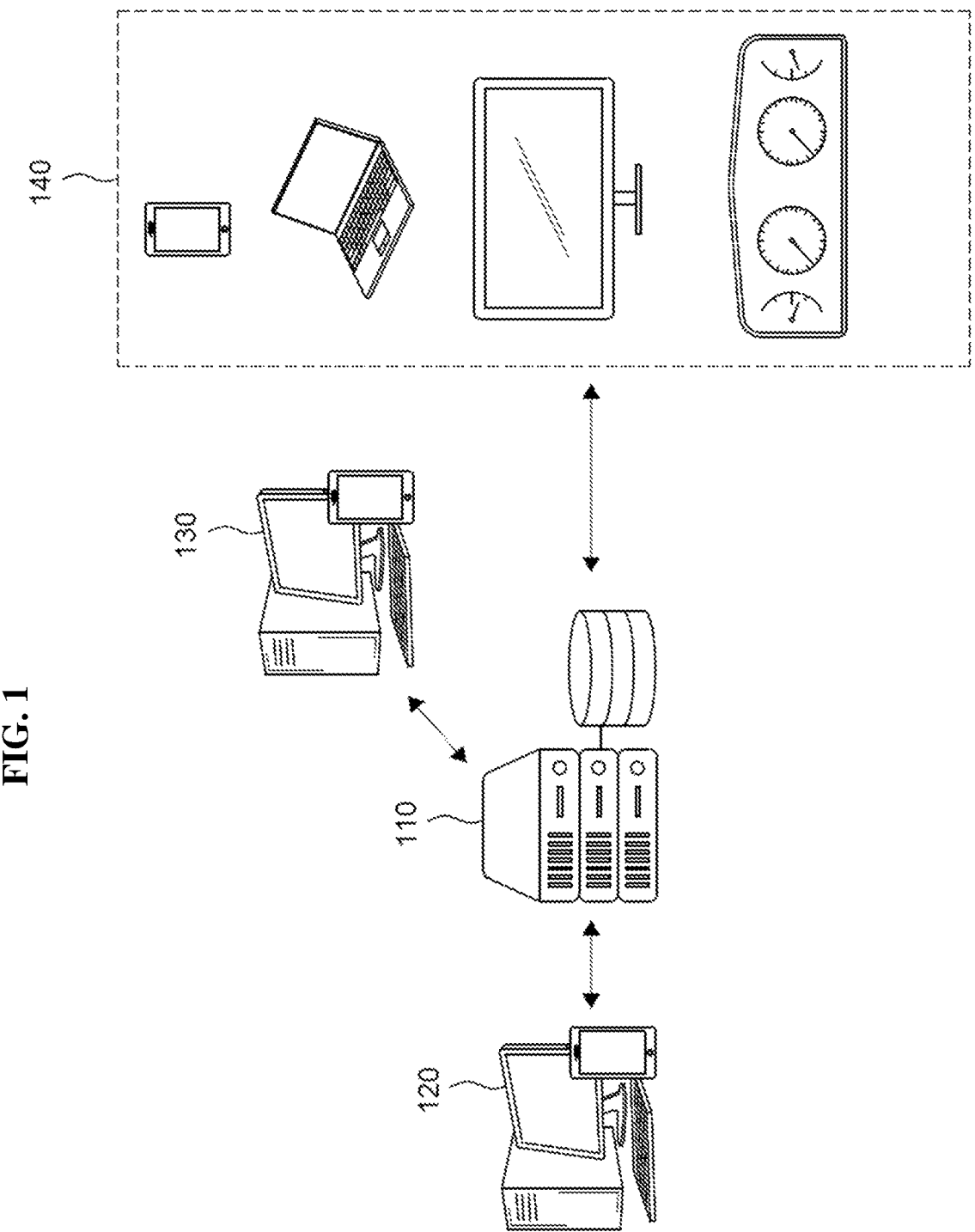
FIG. 1 is a schematic view for explaining a system for providing screen setting data of a plurality of devices according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete the disclosure of the present disclosure and to fully provide a person having ordinary skill in the art to which the present disclosure pertains with the category of the disclosure, and the present disclosure will be defined by the appended claims. In the description of drawings, like reference numerals denote like components.

In this specification, the terms "have", "may have", "include", or "may include" represent the presence of the characteristic (for example, a numerical value, a function, an operation, or a component such as a part), but do not exclude the presence of additional characteristic.

In the specification, the terms "A or B", "at least one of A or/and B", or "at least one or more of A or/and B" may include all possible combinations of enumerated items. For example, the terms "A or B", "at least one of A or/and B", or "at least one or more of A or/and B" may refer to an example which includes (1) at least one A, (2) at least one B, or (3) all at least one A and at least one B.

Although the terms first, second, third, and the like, may be used herein to describe various components regardless of an order and/or importance, the components are not limited by these terms. These terms are only used to distinguish one component from another. For example, a first user device and a second user device may refer to different user devices regardless of the order or the importance. For example, without departing from the scope of the present disclosure, a first component may be referred to as a second component, and similarly, a second component may be referred to as a first component.

When a component (for example, a first component) is referred to as being "(operatively or communicatively) coupled with/to" or "connected to" another component (for example, a second component), it can be understood that the component is directly connected to the other element, or connected to the other element via another component (for example, a third component). In contrast, when a component (for example, a first component) is referred to as being "directly coupled with/to" or "connected to" another component (for example, a second component), it is understood that there may be another component (for example, a third component) between the components.

The terms "configured to (or set to)" may be exchangeably used with "suitable for", "having the capacity to", "designed to", "adapted to", "made to", or "capable of" depending on the situation. The terms "configured to (or set)" may not necessarily mean only "specifically designed to" in a hardware manner. Instead, in some situations, the terms "a device configured to" may mean that the device is capable of doing something together with another device or components". For example, the terms "a processor configured (or set) to perform A, B, and C" may refer to a dedicated processor (for example, an embedded processor) configured to perform the corresponding operation or a generic-purpose processor (for example, a CPU or an application processor) which is capable of performing the operations by executing one or more software programs stored in a memory device.

The terms used in this specification are merely used to describe a specific embodiment but do not intend to limit the scope of another embodiment. A singular form may include a plural form if there is no clearly opposite meaning in the context. Terms used herein including technical or scientific terms may have the same meaning as commonly understood by those skilled in the art. Among the terms used in this specification, terms defined in the general dictionary may be interpreted as having the same or similar meaning as the meaning in the context of the related art but is not ideally or excessively interpreted to have formal meanings unless clearly defined in this specification. In some cases, even though the terms are defined in this specification, the terms are not interpreted to exclude the embodiments of the present specification.

The features of various embodiments of the present disclosure can be partially or entirely bonded to or combined with each other and can be interlocked and operated in technically various ways understood by those skilled in the art, and the embodiments can be carried out independently of or in association with each other.

Hereinafter, various exemplary embodiments of the present disclosure will be described in detail with reference to accompanying drawings.

FIG. 1 is a schematic view for explaining a system for providing screen setting data of a plurality of devices according to an embodiment of the present disclosure.

Referring to FIG. 1, a screen setting system 100 for providing screen setting data of a plurality of devices may be a system which provides a user interface for determining the screen setting data of the plurality of devices and provides screen setting data determined thereby.

The screen setting system 100 may include a service providing server 110 which provides screen setting data for a specific device to a second user device 130 or another user device 140, a first user device 120 which determines screen configuration data through a user interface for determining a screen configuration of a specific device selected by a manufacturer among a plurality of devices, and the second user device 130 which displays a screen based on the screen setting data provided from the service providing server 110 or interworks with another user device 140 to set the another user device 140 to display the screen. For example, the second user device 130 interworks with a smart TV which is another user device 140 of the user to set a screen of the smart TV, but is not limited thereto.

In this specification, the plurality of devices may include a smart phone, a wearable device (for example, a smart watch), a PC, a tablet PC, a smart TV, a smart vehicle and/or an advertisement screen including a display unit which displays a screen, but is not limited thereto.

In the specification, the screen setting data is formed based on screen characteristic data including at least one of a size, a shape, and a resolution for a standard screen which is set in advance in association with each of the plurality of devices and screen configuration data including a background image determined by the manufacturer in association with each of the plurality of devices and at least one of an arrangement, a size, and a shape of a graphic object (for example, an icon or widget, etc.) associated with at least one function.

In the specification, the standard screen may be a screen having an average screen characteristic including at least one of an average size, an average shape, and an average resolution set in advance based on a screen characteristic such as a size, a shape, and a resolution of various models associated with each of the plurality of devices.

In the specification, a user interface for determining screen configuration data may refer to a user interface provided to select at least one of the plurality of devices and determine screen configuration data of the selected device.

First, the service providing server 110 may include a generic purpose computer, a lap top, or a data server which performs various operations to provide the screen setting data used to set a screen for at least one device to the second user device 130 or another user device 140.

The service providing server 110 may provide an application, a widget, a program, or a webpage for determining screen configuration data for each of the plurality of devices to the first user device 120, the second user device 130, and/or another user device 140. The application, the widget, the program, or the webpage selects at least one of the plurality of devices and provides the user interface for determining screen configuration data for the selected device.

Specifically, the service providing server 110 may receive the determined screen configuration data from the first user device 120. The service providing server 110 includes a storage unit such as a database and stores screen configuration data determined by the manufacturer in association with each of the plurality of devices and screen characteristic data based on the screen characteristic data for a predetermined standard screen of each of the plurality of devices. The screen configuration data may be determined by the manufacturer of the first user device 120 by means of the provided application, widget, program, or webpage.

The service providing server 110 receives a screen setting request of the specific device from the second user device 130 and transmits the screen setting data stored in association with the specific device to the specific device upon the request. In this case, the specific device may be the second user device 130 or another user device 140. The screen setting request received from the second user device 130 may include unique screen setting data for the specific device. Here, the unique screen characteristic data may include at least one of a unique size, shape, and resolution for a screen of each of the plurality of devices.

In this case, the service providing server 110 may determine whether the screen setting data stored with regard to the specific device is suitable for the screen setting of the specific device based on the unique screen characteristic data and if the screen setting data is suitable, transmit the corresponding screen setting data to the second user device 130. If the screen setting data is not suitable, the service providing server 110 changes the corresponding screen setting data to screen setting data suitable for screen setting of the specific device and transmits the changed screen setting data to the specific device.

Specifically, the service providing server 110 compares the screen characteristic data of the screen setting data associated with the specific device with the unique screen characteristic data for the specific device and if the screen characteristic data matches the unique screen characteristic data, determines that the screen setting data associated with the specific device is suitable for screen setting of the specific device. For example, if the difference of the screen characteristic data of the screen setting data determined by the manufacturer and the screen characteristic data for the specific device is smaller than a predetermined threshold, it is determined that two data match and if the difference between two screen characteristic data is equal to or larger than the predetermined threshold, it is determined that two data do not match.

In various embodiments, the service providing server 110 may generate screen setting data for each of the plurality of devices using the screen setting data for the specific device. To this end, the service providing server 110 collects and stores the unique screen characteristic data for each of the plurality of devices. The service providing server 110 changes the screen setting data for the specific device based on the unique screen characteristic data of each of the plurality of devices and stores the screen setting data changed in association with each of the plurality of devices in the storage unit.

Next, the first user device 120 may be a user interface device for selecting at least one of the plurality of devices and determining screen configuration data of the selected device, such as a smart phone, a tablet PC, a PC, a smart TV, or a smart vehicle in which an application, a program, a widget, or a web browser therefor is installed.

The first user device 120 provides at least one interface screen to determine the screen configuration data through the installed application, program, or widget and transmits the screen configuration data configured thereby to the service providing server 110.

At least one interface screen for determining screen configuration data may include at least one interface screen to select at least one device among the plurality of devices and determine the screen configuration of the selected device. For example, at least one interface screen may be an interface screen for providing at least one template in which various graphic contents used for screen configuration are configured by a position, a size, and a shape with a predetermined format.

Accordingly, the manufacturer may design a screen to which the manufacturer's preference in association with the specific device is reflected.

Next, the second user device 130 may be a user interface device for setting a screen for at least one device, such as a smart phone, a tablet PC, a PC, a smart TV, or a smart vehicle in which an application, a program, a widget, or a web browser therefor is installed.

The second user device 130 provides at least one interface screen for setting a screen for at least one device through the installed application, program, or widget. Specifically, the second user device 130 requests the service providing server 110 to set the screen for at least one device through the installed application, program, or widget and receives screen setting data for at least one device from the service providing server 110. Here, at least one device may be the second user device 130 or another user device 140 interworking with the second user device 130. Further, the screen setting request may include unique screen characteristic data for at least one device.

When at least one device is the second user device 130, the second user device 130 may display a graphic screen based on the received screen setting data through the display unit. When at least one device is another user device 140, the second user device 130 may request the service providing server 110 to allow another user device 140 to set the screen based on the received screen setting data. Accordingly, another user device 140 receives the screen setting data from the service providing server 110 and displays the graphic screen based on the received screen setting data through the display unit.

As described above, according to the present disclosure, screen setting data for each of the plurality of devices is provided using screen setting data based on screen configuration data determined by the manufacturer in association with the specific device and screen characteristic data for a predetermined standard screen. Therefore, the inconvenience of the manufacturer to select a size, a shape and/or a resolution of a display panel in accordance with a model of the specific device may be reduced.

Further, according to the present disclosure, the screen setting data associated with the specific device is changed to be suitable for a screen characteristic of another model or another type of device. Therefore, the inconvenience of the manufacturer to separately generate screen configuration data associated with a different model or different type of device from the specific device after generating the screen configuration data for the specific device may be reduced.

Hereinafter, the service providing server 110 will be described in more detail with reference to FIGS. 1 and 2.

FIG. 2 is a schematic view for a service providing server according to an embodiment of the present disclosure.

Referring to FIGS. 1 and 2, the service providing server 200 includes a communication unit 210, a storage unit 220, and a processor 230. In the proposed embodiment, the service providing server 200 may refer to the service providing server 110 of FIG. 1.

The communication unit 210 communicatively connects the service providing server 200 with the external device. The communication unit 210 is connected to the first user device 120, the second user device 130 and/or another user device 140 using wired/wireless communication to transmit and receive various data.

Specifically, the communication unit 210 receives the screen setting data determined for screen setting of at least one device from the first user device 120 and receives the screen setting request for the specific device from the second user device 130 and/or another user device 140. The communication unit 210 may transmit the screen setting data for the specific device to the second user device 130 and/or another user device 140.

The storage unit 220 may store various data used to provide the screen setting data of the specific device. Specifically, the storage unit 220 may store the screen characteristic data for a standard screen which is set in advance in association with each of the plurality of devices. The storage unit 220 may store the screen setting data for the specific device received from the first user device 120. In various embodiments, the storage unit 220 stores unique screen setting data collected in association with each of the plurality of devices and screen setting data changed based on the unique screen setting data for each of the plurality of devices.

In various embodiments, the storage unit 220 may include at least one type of storage medium of flash memory type, hard disk type, multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. service providing device 200 may operate in association with a web storage which performs a storage function of the storage unit 220 on the Internet.

The processor 230 is operatively connected to the communication unit 210 and the storage unit 220 and performs various commands to provide the screen setting data for the specific device.

Specifically, the processor 230 receives the screen configuration data determined by the manufacturer in association with at least one device from the first user device 120 and stores the screen setting data based on the screen characteristic data for the standard screen set in advance in association with at least one device in the storage unit 220.

Here, the standard screen may be set in advance to reduce the inconvenience of the manufacturer to select any one of various models corresponding to at least one device to determine the screen configuration.

Accordingly, the processor 230 collects the unique screen characteristic data for various types of smart phones and determines at least one of a size, a shape, and a resolution of the standard screen corresponding to the smart phone based on the collected unique screen characteristic data. For example, the processor 230 may determine at least one of an average size, an average shape, and an average resolution for at least one of a unique size, a unique shape, and a unique resolution of various types of smart phone screens. It is assumed that a unique size of a screen of a model A of a smart phone is "5.5 cm(Length)×12.5 cm(width)", a unique size of a screen of a model B of a smart phone is "6.5 cm×13.5 cm", and a unique size of a screen of a model C of a smart phone is "5 cm×12 cm". In this case, the standard screen of the smart phone may be "5.7×12.6" (the average value of "5.5 cm×12.5 cm", "6.5 cm×13.5 cm" and "5 cm×12 cm").

When the screen setting request for the specific device is received from the second user device 130, the processor 230 transmits screen setting data associated with the specific device among the screen setting data stored in the storage unit 220 to the specific device.

Accordingly, the processor 230 determines whether the screen setting data stored in the storage unit 220 associated with the specific device is suitable to set the screen of the specific device based on the unique screen characteristic data for the specific device included in the screen setting request and if the screen setting data is suitable, transmits the screen setting data for the specific device to the specific device. If the screen setting data is not suitable, the processor 230 changes the screen setting data based on the unique characteristic data of the specific device and transmits the changed screen setting data to the specific device.

For example, the processor 230 compares a size of the standard screen set in advance in association with the specific device and a size of the unique screen of the specific device and if the difference between two screen sizes is smaller than a threshold, determines that the screen setting data is suitable for the screen setting of the specific device. If the difference between two screen sizes is equal to or larger than the threshold, the processor 230 may determine that the screen setting data is not suitable for the screen setting of the specific device. In this case, the processor 230 changes the size of the standard screen to be equal to the size of the unique screen of the specific device and changes at least one of a resolution, a background image, an arrangement, a size, and a shape of a graphic object corresponding to at least one function, based on the changed size of the standard screen. With regard to this, when the size of the standard screen is reduced, the processor 230 may perform an operation of lowering a resolution of the standard screen, reducing a size of the background image, reducing the size of the graphic object, or changing the shape of the graphic object to be suitable for size reduction, based on the reduced size, but is not limited thereto. When the size of the standard screen is enlarged, the processor 230 may perform an operation of increasing a resolution of the standard screen, enlarging a size of the background image, enlarging the size of the graphic object, or changing the shape of the graphic object to be suitable for size enlargement, based on the enlarged size, but is not limited thereto. In various embodiments, not only the size of the standard screen, but also the shape and/or the resolution may be changed and the screen configuration data may also be changed by the change.

As described above, according to the present disclosure, the screen setting data is changed based on the standard screen having at least one of the average size, the average shape, and the average resolution, so that the screen configuration data may be changed within a range which does not significantly change the intention of the manufacturer.

In various embodiments, the processor 230 may collect the unique screen characteristic data for each of the plurality of devices and generate the screen setting data for each of the plurality of devices based on the collected unique screen characteristic data to store the screen setting data in the storage unit 220. Specifically, when the screen setting data for the specific device is generated, the processor 230 changes the screen setting data for the specific device based on the unique screen characteristic data for each of the plurality of devices and stores the changed screen setting data as screen setting data for each of the plurality of devices. When the screen setting request for the specific device is received from the first user device 120, the processor 230 transmits the screen setting data for the specific device among the stored screen setting data for each of the plurality of devices to the specific device.

Therefore, according to the present disclosure, the manufacturer does not select the size, the shape, and/or the resolution of the display panel in accordance with the model of the specific device in order to generate the screen configuration data for the specific device, so that a time consumed for the screen configuration may be reduced and the convenience of the screen configuration may be increased.

In various embodiments, the processor 230 changes the screen setting data generated with regard to the specific device to screen setting data for a different type of device from the specific device and provides the changed screen setting data as screen setting data for a different type of device. For example, the processor 230 may change the screen setting data generated with regard to the smart phone to screen setting data for setting a screen of a PC, a smart TV and/or a smart vehicle. To this end, the processor 230 may determine at least one of a background image determined by the manufacturer with regard to the smart phone, a background image for the screen of the PC, the smart TV and/or the smart vehicle corresponding to at least one of the arrangement, the size, and the shape of the graphic object corresponding to various functions of the smart phone, and the arrangement, the size, and the shape of the graphic object corresponding to various functions of the PC, the smart TV and/or the smart vehicle. When there is no function of the PC, the smart TV and/or the smart vehicle corresponding to a specific function of the smart phone, the processor 230 may exclude the graphic object corresponding to the function at the time of generating screen setting data.

Accordingly, according to the present disclosure, when screen configuration data for one device is generated, the manufacturer does not generate screen setting data for a different type of device from the corresponding device as well as the different model of the device, so that the convenience for screen configuration is enhanced and thus the consumed time and resources may be minimized.

Hereinafter, the first user device 120 will be described in more detail with reference to FIGS. 1 and 3.

Figure 3:
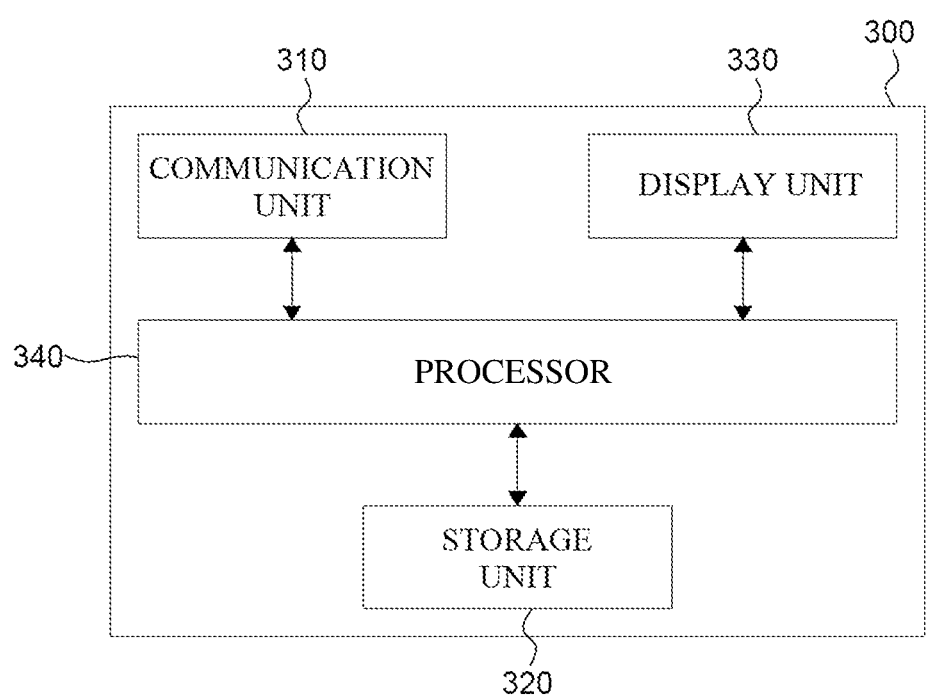
FIG. 3 is a schematic view for a first user device according to an embodiment of the present disclosure.

FIG. 3 is a schematic view for a first user device according to an embodiment of the present disclosure.

Referring to FIGS. 1 and 3, the first user device 300 includes a communication unit 310, a storage unit 320, a display unit 330, and a processor 340. In the proposed embodiment, the first user device 300 may refer to the first user device 120 of FIG. 1.

The communication unit 310 connects the first user device 300 to communicate with the external device. The communication unit 310 is connected to the service providing server 110 using wired/wireless communication to transmit and receive various data. Specifically, the communication unit 310 may transmit the screen configuration data for the specific device to the service providing server 110.

The storage unit 320 may store various data used to generate screen configuration data for at least one device using a user interface for generating screen configuration data. In various embodiments, the storage unit 320 may store various data according to an application, a widget, a program and/or a webpage for generating screen configuration data.

In various embodiments, the storage unit 320 may include at least one storing medium of a flash memory type, a hard disk type, a multimedia card micro type, a card type memory (for example, an SD or XD memory), a RAM, an SRAM, a ROM, an EEPROM, a PROM, a magnetic memory, a magnetic disk, and an optical disk. The first user device 300 may operate in association with a web storage which performs the storing function of the storage unit 320 on the Internet.

The display unit 330 may display various contents (for example, texts, images, videos, icons, banners, or symbols) to the user. Specifically, the display unit 330 may display an interface screen used to generate the screen configuration data.

In various embodiments, the display unit 330 may include a touch screen and for example, may receive touch, gesture, proximity, drag, swipe, or hovering input which uses an electronic pen or a part of a body of the user.

The processor 340 is operatively connected to the communication unit 310, the storage unit 320, and the display unit 330 and performs various commands to generate the screen configuration data for at least one device.

Specifically, the processor 340 may display at least one interface screen for generating screen configuration data for at least one device through the display unit 330.

At least one interface screen as described above may include a first interface screen which selects at least one of a plurality of devices for screen setting, a second interface screen which determines a background image for at least one device, and a third interface screen which determines at least one of an arrangement, a size, and a shape of a graphic object corresponding to various functions of at least one device. For example, the first interface screen may be an interface screen which selects at least one of a smart phone, a PC, a smart TV, a smart vehicle, and an advertisement screen including a display unit which displays a graphic screen. The second interface screen may be an interface screen which selects any one of at least one background image applicable to a standard screen of the selected device. The third interface screen may be an interface screen which disposes at least one function applicable to a selected standard screen and a graphic objet corresponding to at least one function, adjusts a size of the graphic object, and determines a shape of the graphic object.

The processor 340 generates screen configuration data including the background image and at least one of the arrangement, the size, and the shape of the graphic object determined through the interface screen and transmits the generated screen configuration data to the service providing server 110.

In various embodiments, at least one interface screen described above may include an area for a preview of a standard screen set in advance with regard to at least one device or a preview of a graphic screen to which the background image is determined by the manufacturer, and at least one of the arrangement, the size, and the shape of the graphic object corresponding to at least one function is applied.

Accordingly, according to the present disclosure, the manufacturer may conveniently generate the screen configuration data without inconvenience for selecting a model of at least one device and a time taken to generate the screen configuration data may be reduced.

Further, according to the present disclosure, the inconvenience of the manufacturer to individually generate the screen configuration data for each of the plurality of devices may be minimized.

Hereinafter, the second user device 130 will be described in detail with reference to FIGS. 1 and 4.

Figure 4:
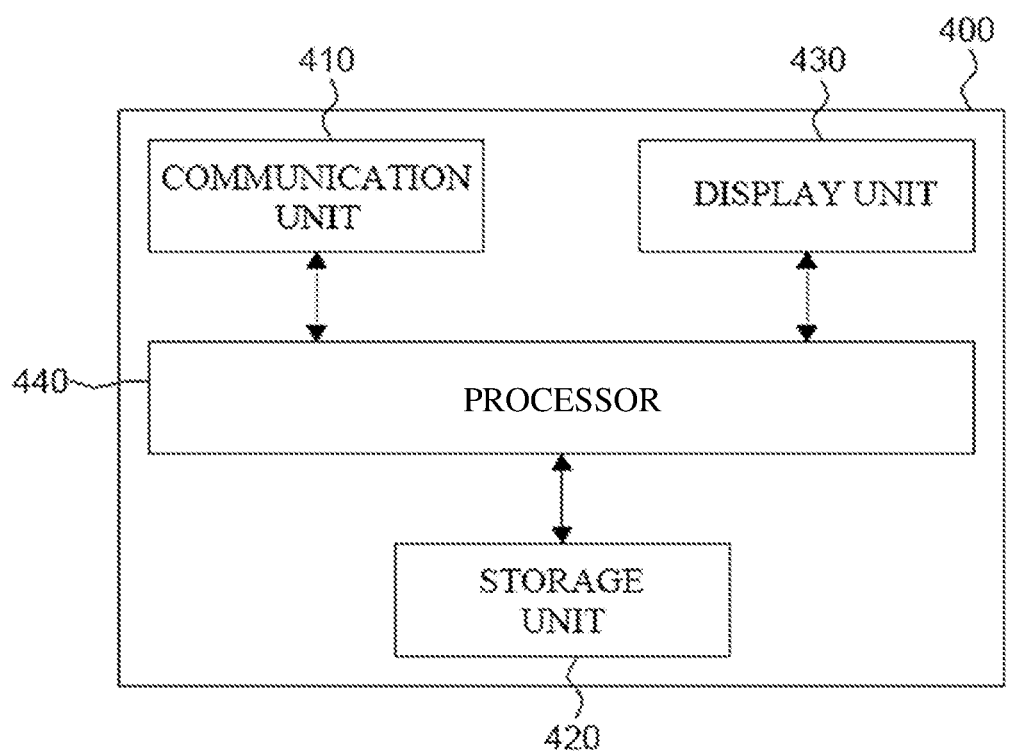
FIG. 4 is a schematic view for a second user device according to an embodiment of the present disclosure.

FIG. 4 is a schematic view for a second user device according to an embodiment of the present disclosure.

Referring to FIGS. 1 and 4, the second user device 400 includes a communication unit 410, a storage unit 420, a display unit 430, and a processor 440. In the proposed embodiment, the second user device 400 may refer to the second user device 130 of FIG. 1.

The communication unit 410 connects the second user device 400 to communicate with the external device. The communication unit 410 is connected to the service providing server 110 and/or another user device 140 using wired/wireless communication to transmit and receive various data.

Specifically, the communication unit 410 requests the service providing server 110 screen configuration data for the specific device and receives the screen configuration data from the service providing server 110. In various embodiments, the communication unit 410 may transmit screen setting data for the specific device received from the service providing server 110 to another user device 140.

The storage unit 420 may store various data used to request and receive the screen setting data and set the screen based on the received screen setting data or allow another user device 140 interworking the second user device 400 to set the screen based on the screen setting data. In various embodiments, the storage unit 420 may store an application, a widget, a program and/or a webpage for requesting and receiving screen setting data or store various data therefor.

In various embodiments, the storage unit 420 may include at least one storing medium of a flash memory type, a hard disk type, a multimedia card micro type, a card type memory (for example, an SD or XD memory), a RAM, an SRAM, a ROM, an EEPROM, a PROM, a magnetic memory, a magnetic disk, and an optical disk. The second user device 400 may operate in association with a web storage which performs the storing function of the storage unit 420 on the Internet.

The display unit 430 may display various contents (for example, texts, images, videos, icons, banners, or symbols) to the user. Specifically, the display unit 430 may display various interface screens used to request and receive the screen setting data and set the screen based on the received screen setting data or allow another user device 140 to set the screen based on the screen setting data.

In various embodiments, the display unit 430 may include a touch screen and for example, may receive touch, gesture, proximity, drag, swipe, or hovering input which uses an electronic pen or a part of a body of the user.

The processor 440 is operatively connected to the communication unit 410, the storage unit 420, and the display unit 430 and performs various commands for requesting and receiving screen setting data for a specific device, displaying a graphic screen based on the received screen setting data, or allowing another user device 140 to display the graphic screen.

Specifically, the processor 440 may display at least one interface screen to request and receive screen setting data for a specific device, set a screen based on the received screen setting data, or allow another user device 140 which interworks with the second user device 400 to set a screen based on screen setting data through the display unit 430. At least one interface screen may include an interface screen which requests and receives the screen setting data for the specific device and sets the screen based on the received screen setting data or allow another user device 140 to set the screen based on the screen setting data.

For example, the interface screen may include a preview screen to preview a graphic screen based on the screen setting data generated with regard to each of the plurality of devices and a first icon corresponding to a function of downloading the screen setting data.

When the first icon is selected, the processor 440 may transmit a screen setting request for requesting screen setting data for the second user device 400 to the service providing server 110. In this case, the processor 440 may transmit the screen setting request including unique screen characteristic data of the second user device 400 to the service providing server 110.

When the screen setting data for the second user device 400 is received from the service providing server 110 in accordance with the screen setting request, the processor 440 may set the screen based on the received screen setting data. For example, the processor 440 may display a graphic screen based on the screen setting data through the display unit 430.

In various embodiments, the interface screen may further include a second icon corresponding to a function of downloading screen setting data for another user device 140.

When the second icon is selected, the processor 440 may transmit a screen setting request for requesting screen setting data for another user device 140 to the service providing server 110. In this case, the processor 440 requests another user device 140 unique screen characteristic data of another user device 140 and when the unique screen characteristic data is received from another user device 140, transmits a screen setting request including the unique screen characteristic data of another user device 140 to the service providing server 110.

When the screen setting data for another user device 140 is received from the service providing server 110, the processor 440 transmits the received screen setting data to another user device 140 to allow another user device 140 to set the screen based on the screen setting data. Alternatively, the service providing server 110 may transmit the screen setting data for another user device 140 to another user device 140.

Hereinafter, a method for providing screen setting data for a specific device by a service providing server 110 will be described with reference to FIG. 5.

Figure 5:
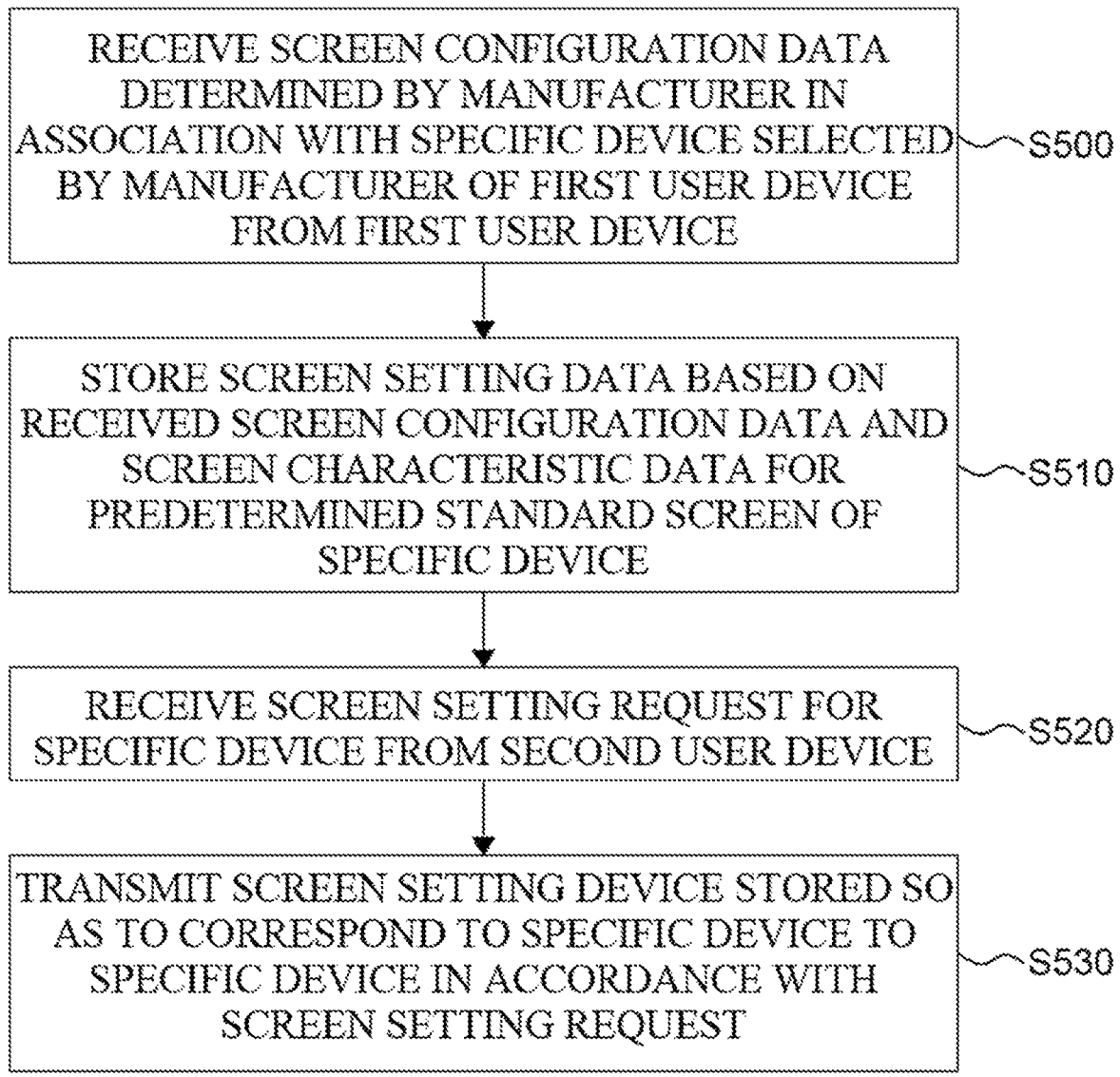
FIG. 5 is a schematic flowchart for explaining a method for providing screen setting data for a specific device from a service providing server according to an embodiment of the present disclosure.

FIG. 5 is a schematic flowchart for explaining a method for providing screen setting data for a specific device from a service providing server according to an embodiment of the present disclosure. Operations to be described below will be performed by a processor 230 of the service providing servers 110 and 200.

Referring to FIG. 5, the service providing server 110 receives screen configuration data determined by a manufacturer in association with a specific device selected by a manufacturer of the first user device 120 from the first user device 120 in step S500. The service providing server 110 stores the received screen configuration data and screen setting data based on screen characteristic data for a predetermined standard screen of the specific device in step S510.

The service providing server 110 receives a screen setting request for the specific device from the second user device 130 in step S520 and transmits the screen setting data stored with regard to the specific device to the specific device upon the screen setting request in step S530. When the specific device is the second user device 130, the screen setting data is transmitted to the second user device 130 and when the specific device is another user device 140, the screen setting data may be transmitted to another user device 140.

Hereinafter, a user interface for determining screen configuration data for a specific device by a first user device 120 will be described with reference to FIGS. 6A to 6G.

FIGS. 6A to 6G are exemplary views for determining screen configuration data for a specific device according to an embodiment of the present disclosure. In the proposed embodiment, the interface screen may be displayed through the display unit 330 of the first user device 300 of FIG. 3.

Figure 6A:
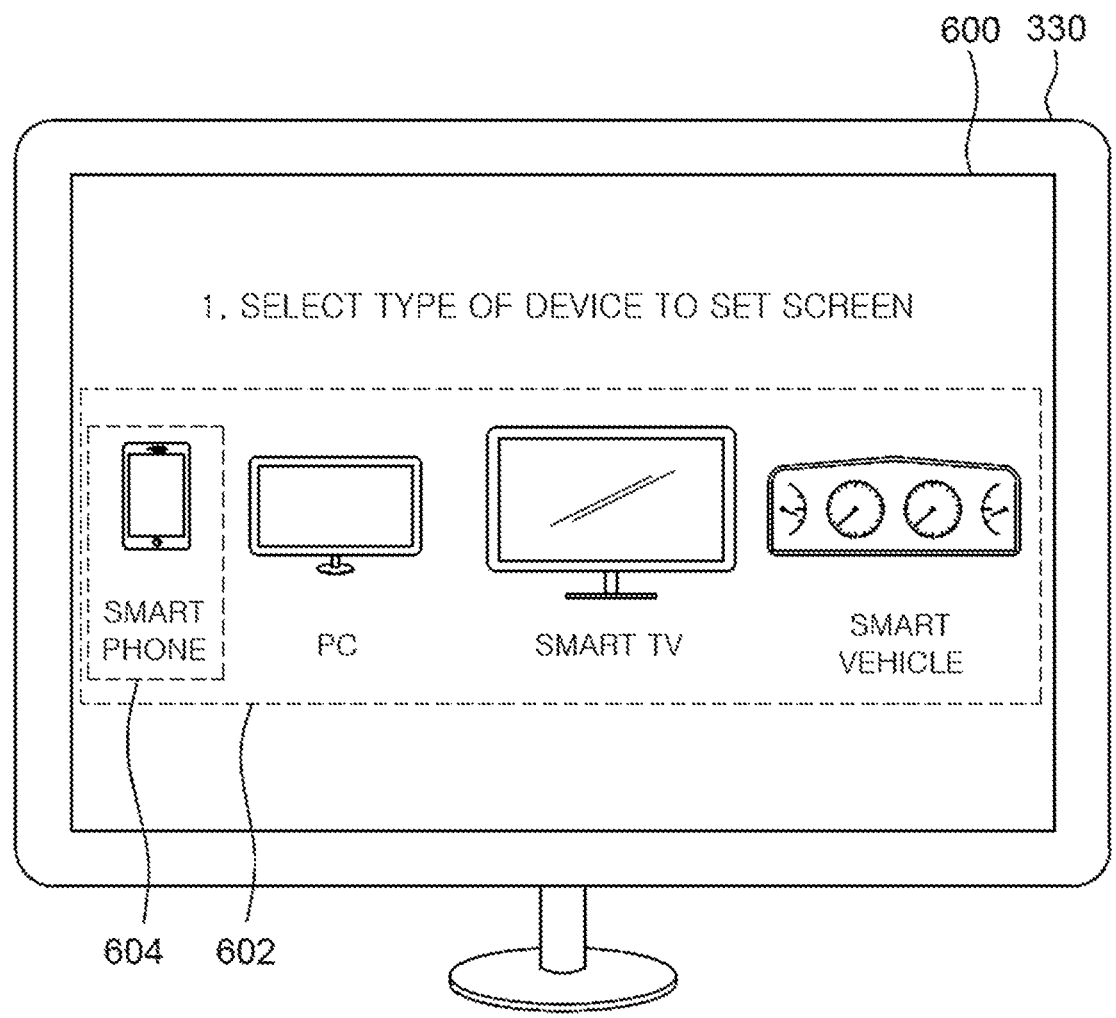
FIGS. 6A to 6G are exemplary views for determining screen configuration data for a specific device according to an embodiment of the present disclosure.

Referring to FIG. 6A, the first user device 300 may display a first interface screen 600 for determining screen configuration data for at least one device on the display unit 330.

The first interface screen 600 may include a device selection area 602 to select any one of a plurality of devices for screen setting. The device selection area 602 may include graphic objects representing a smart phone, a PC, a smart TV, and a smart vehicle corresponding to the plurality of devices. For example, when a graphic object 604 corresponding to a smart phone is selected, the first user device 300 may display a second interface screen 606 for screen configuration of the smart phone as illustrated in FIG. 6B.

Figure 6B:
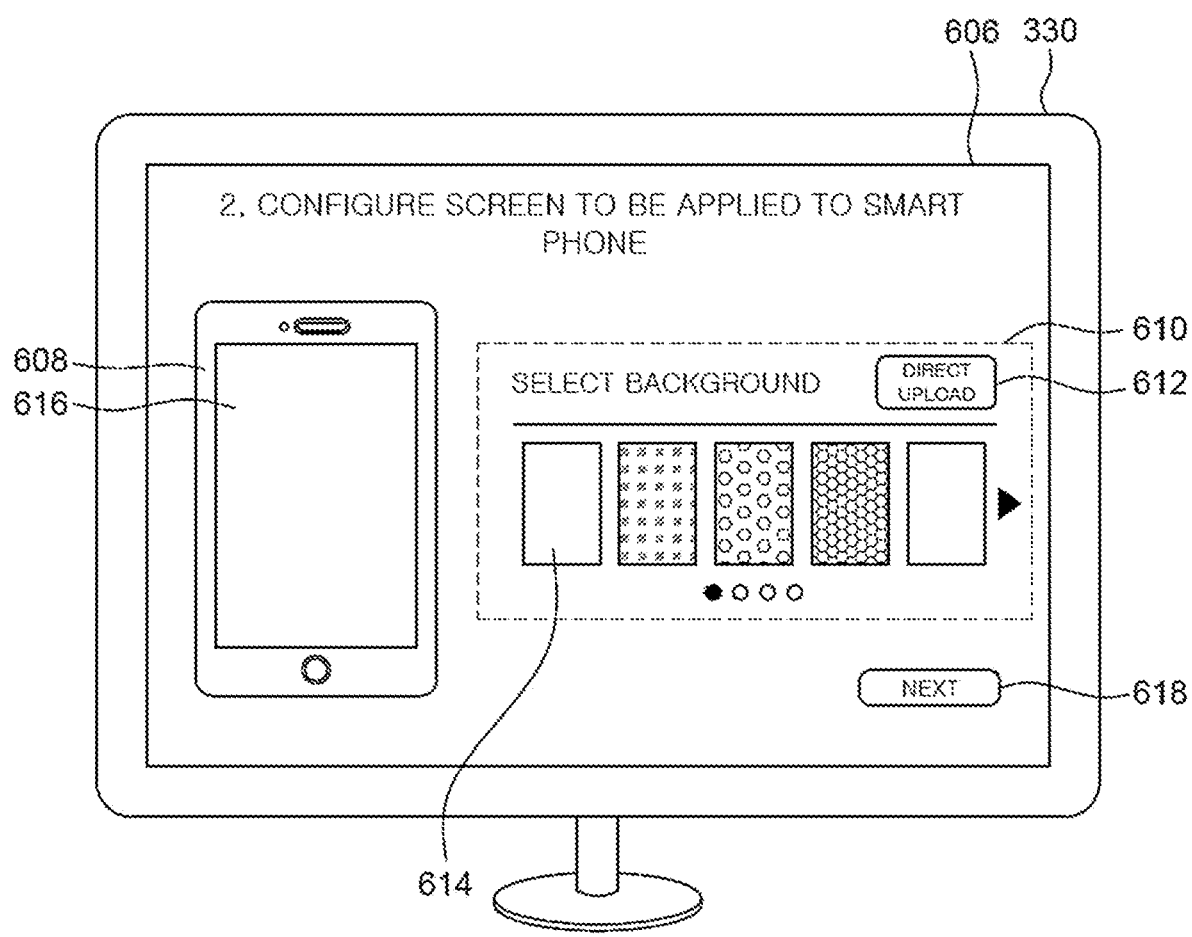

Referring to FIG. 6B, the second interface screen 606 may include a standard screen of a smart phone, a preview area 608 for previewing various graphic objects applied to the standard screen, and a background selection area 610 for selecting a background image.

The background selection area 610 may include graphic objects representing at least one background image which is applicable to the display screen of the smart phone. Further, the background selection area 610 may further include an icon 612 corresponding to a function of uploading a background image desired by the manufacturer.

Figure 6C:
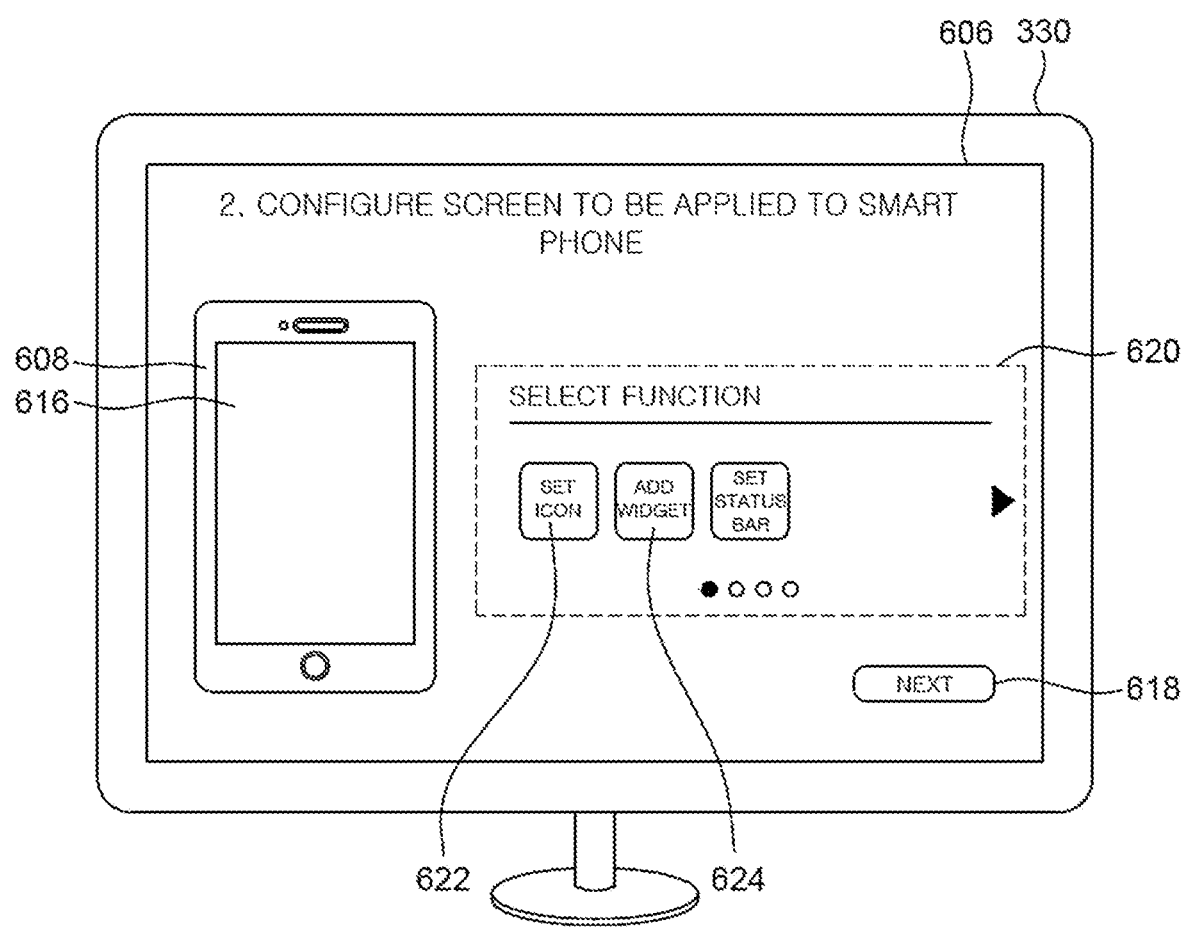

When a specific background image 614 is selected by the manufacturer, the first user device 300 may display the background image 614 selected as illustrated in FIG. 6C, in a display region 616 of the preview area 608. For example, when a specific background image 614 is selected by the manufacturer and an icon 618 for performing a next operation is selected, the first user device 300 displays the selected background image 614 in a display area 616 as illustrated in FIG. 6C and displays a function setting area 620 for determining a graphic object corresponding to at least one function of the smart phone on a second interface screen 606.

Referring to FIG. 6C, the function setting area 620 may include a first graphic object 622 corresponding to a function of setting an icon, a second graphic object 623 corresponding to a function of setting a widget, and a third graphic object for setting a status bar, but is not limited thereto.

Figure 6D:
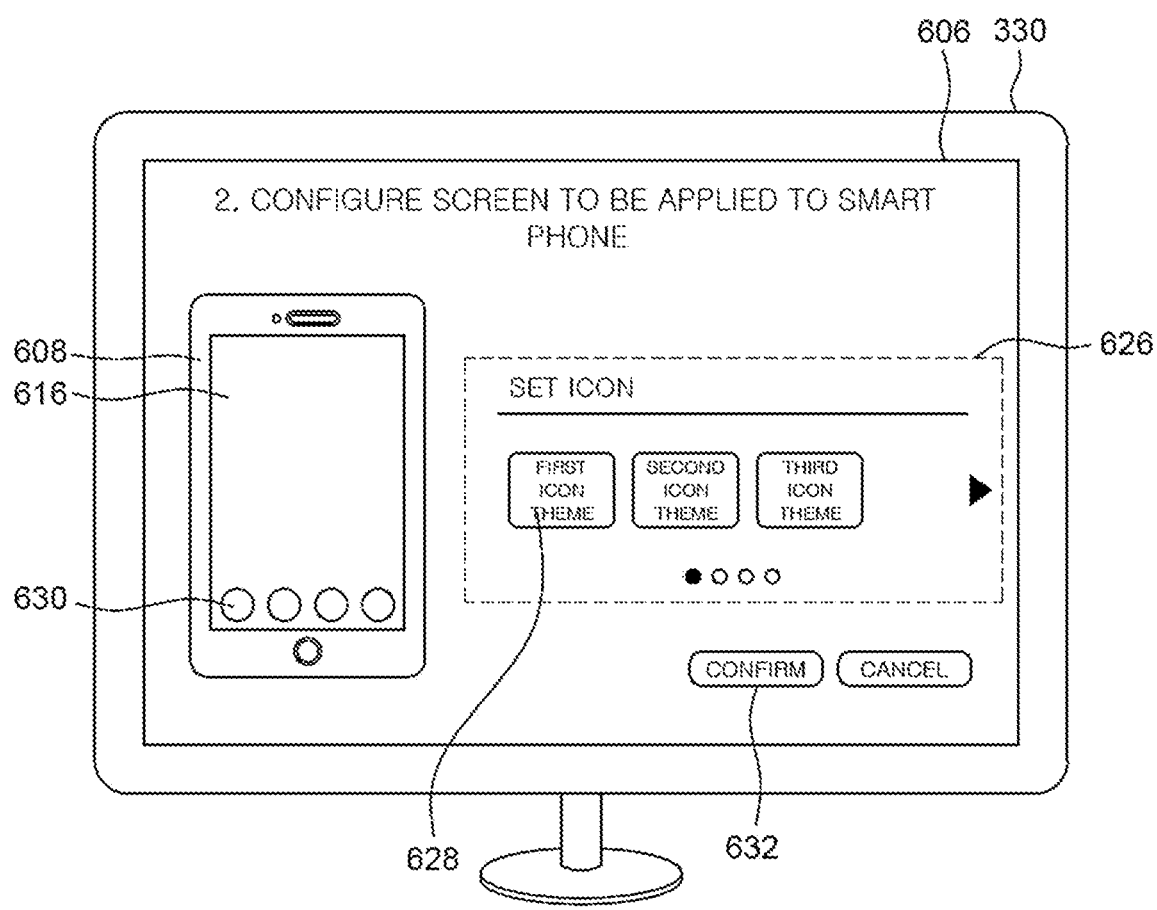

When the first graphic object 622 is selected, the first user device 300 may display an icon theme setting area 626 to determine a characteristic such as a shape, a size, and a background of at least one icon designed in accordance with various themes on a second interface screen 606 as illustrated in FIG. 6D.

Referring to FIG. 6D, the icon theme setting area 626 may include a first graphic object 628 representing an icon characteristic corresponding to a first icon theme, a second graphic object representing an icon characteristic corresponding to a second icon theme, and a third graphic object representing an icon characteristic corresponding to a third icon theme.

When the first graphic object 628 is selected, the first user device 300 may display a preview image 634 of an icon set having an icon characteristic for the first icon theme in the display region 616. In various embodiments, when there is an input to move a preview image of any one icon among preview images 638 of the icon set to a specific position by an input interface device such as a mouse, the first user device 300 may move the preview image of the corresponding icon to a specific position and display the preview image. Position information of the preview image moved as described above may be provided to the service providing server 110 as screen configuration data.

When a confirmation icon 632 is selected after selecting the icon theme, the first user device 300 may display the function setting area 620 on the second interface screen 606 as illustrated in FIG. 6C again.

Figure 6E:
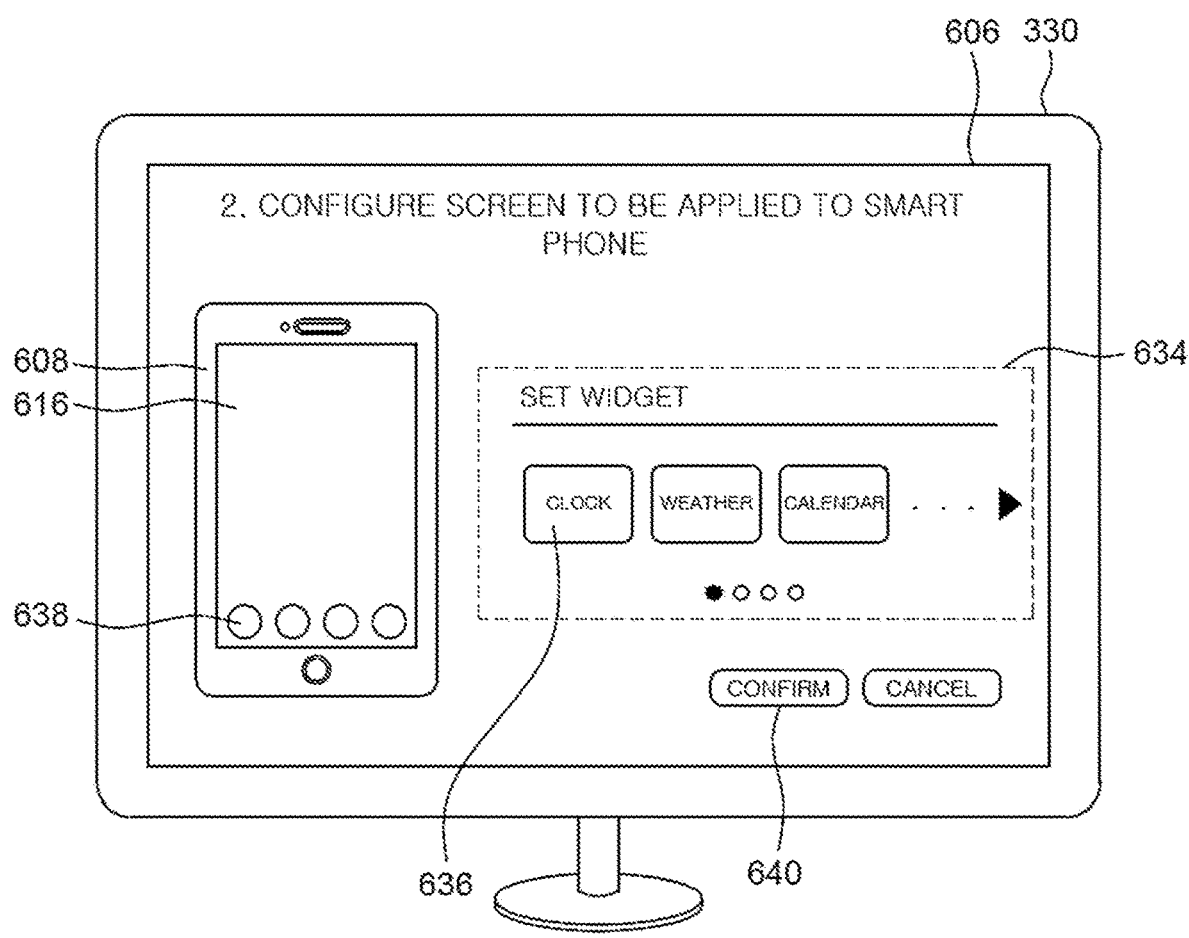

In FIG. 6C, when the second graphic object 624 for setting a widget is selected, the first user device 300 may display the widget setting area 634 for determining at least one widget of the smart phone on the second interface screen 606 as illustrated in FIG. 6E.

Referring to FIG. 6E, the widget setting area 634 may include a first graphic object 636 for setting a clock widget, a second graphic object for setting a weather widget, and a third graphic object for setting a calendar widget, but is not limited thereto. When the first graphic object 636 is selected, the first user device 300 may display a clock widget setting area 642 for determining a clock widget on the second interface screen 606 as illustrated in FIG. 6F.

Figure 6F:
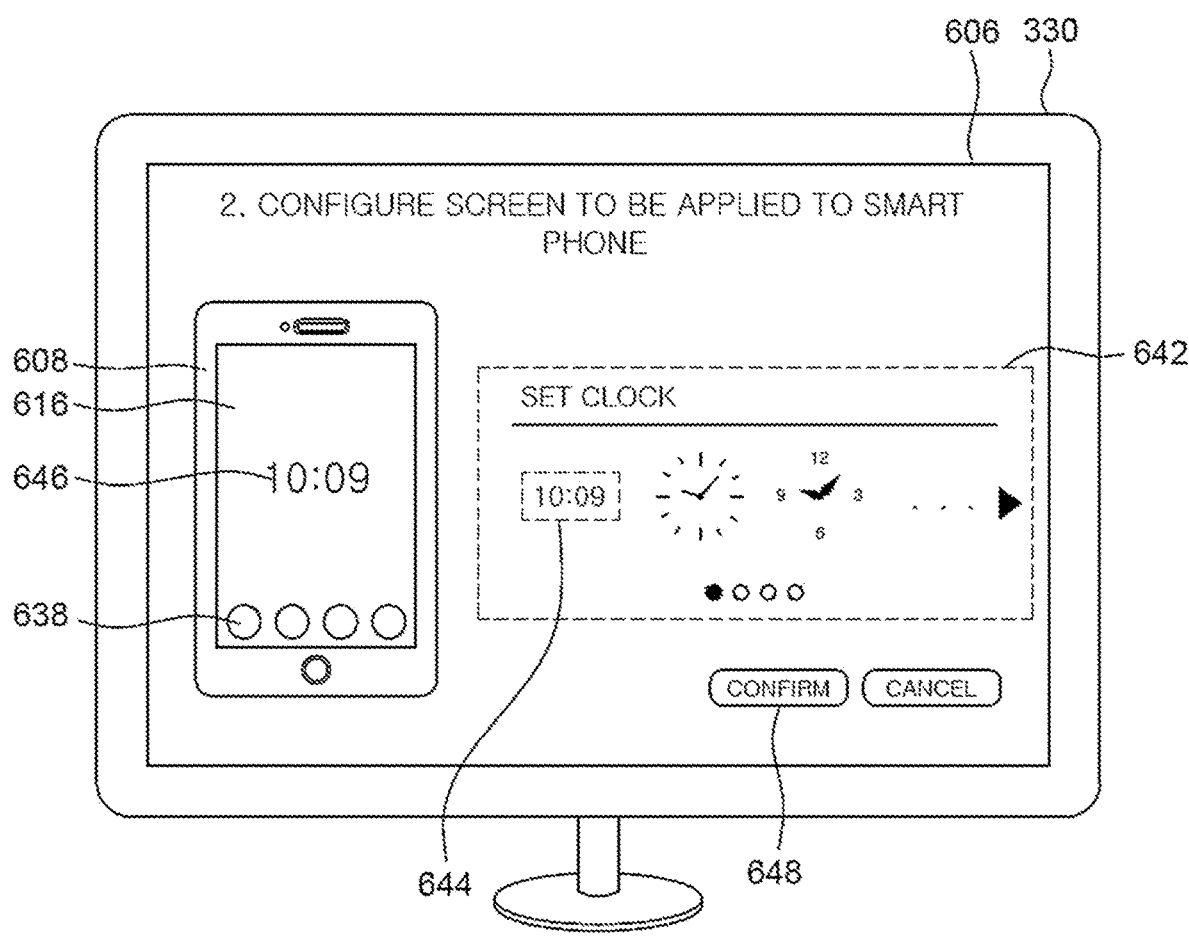

Referring to FIG. 6F, the clock widget setting area 642 may include graphic objects representing clock widgets having various designs. When a graphic object 644 representing a clock widget having a specific design is selected, the first user device 300 may display a preview image 646 of the selected clock widget in the display region 616. In various embodiments, when there is an input to move the preview image 646 of the clock widget to a specific position through the input interface device, the first user device 300 may move the preview image 646 of the clock widget to the specific position to display the preview image. Position information of the preview image 646 moved as described above may be provided to the service providing server 110 as screen configuration data.

Figure 6G:
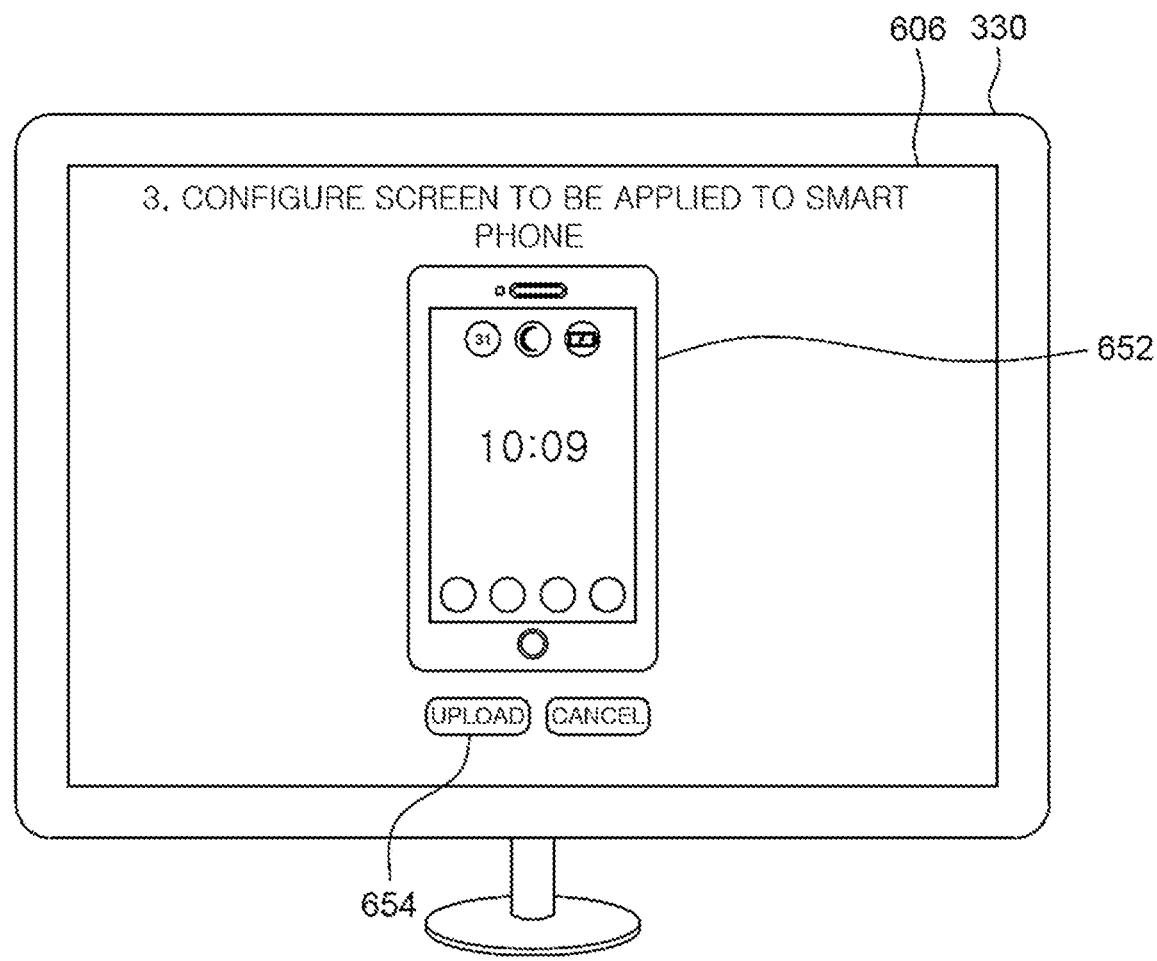

When the screen configuration is completed by selecting conform icon 648 after widget setting, the first user device 300 may display a third interface screen 650 including the preview image 652 of the graphic screen implemented based on the screen configuration data determined by the manufacturer and an icon 654 corresponding to an uploading function as illustrated in FIG. 6G.

When the icon 564 for uploading is selected, the first user device 300 may transmit screen configuration data including a background image determined by the above-described interface screen and at least one of an arrangement, a size, and a shape of the graphic object corresponding to at least one function to the service providing server 110. For example, the screen configuration data may include information about the background image selected by the manufacturer, information about the selected icon theme, information about the selected widget, an arrangement and/or a size of the icon, and an arrangement and/or a size of the widget, but is not limited thereto. When the background image is uploaded by the manufacturer and the uploaded background image is selected, the screen configuration data may further include an uploaded background image.

Accordingly, the manufacturer may freely configure a screen of at least one device by reflecting own intention.

Even though in the proposed embodiment, an operation of selecting and determining a background image, an icon theme, and a widget in this order to generate the screen configuration data has been described, the embodiment is not limited thereto so that the screen configuration data may be determined according to various orders or configurations.

In the proposed embodiment, the interface screen for screen configuration is not limited to the above description and may be implemented with various configurations and designs.

Hereinafter, a method for allowing a plurality of users to share screen setting data for at least one device will be described with reference to FIG. 7.

Figure 7:
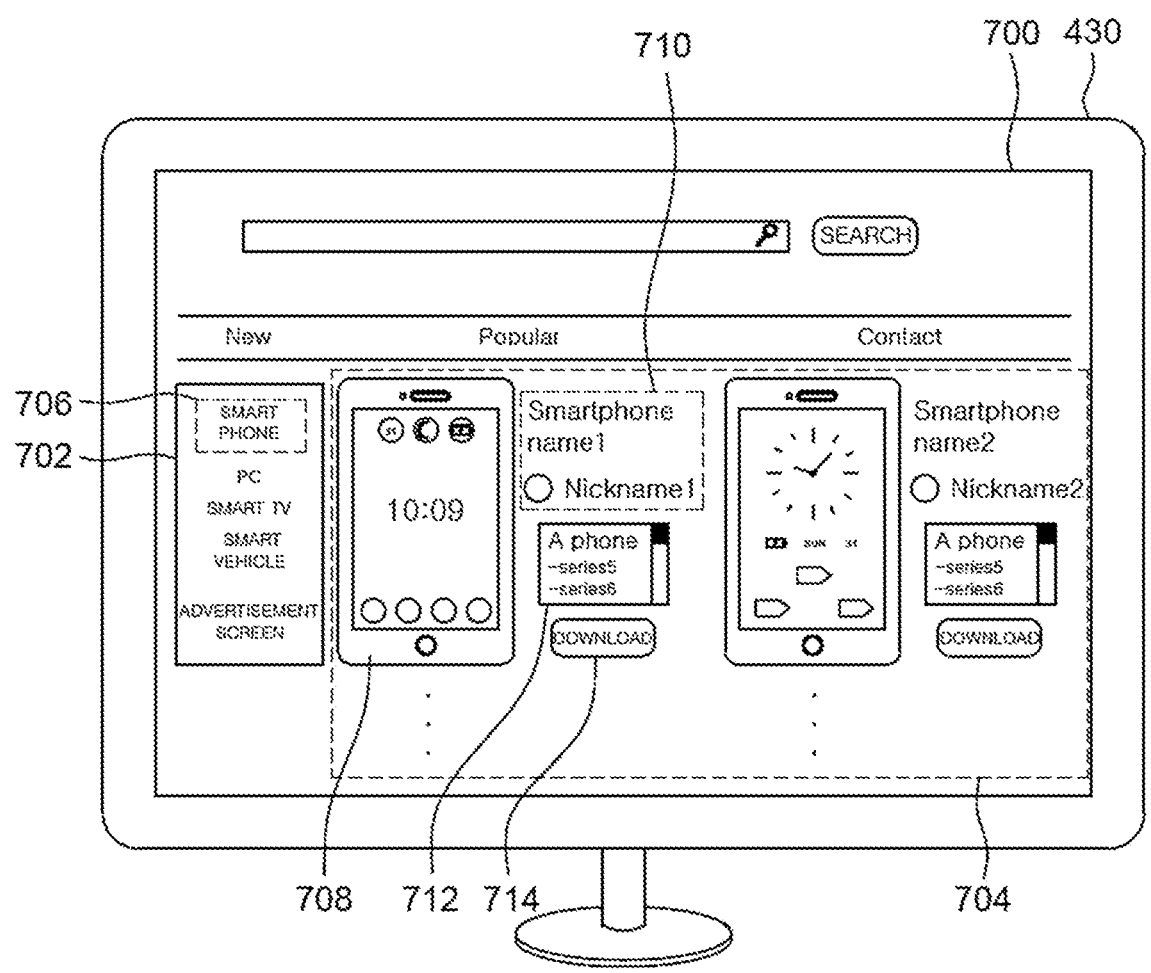
FIG. 7 is an exemplary view of an interface screen for sharing screen setting data for at least one device according to an embodiment of the present disclosure.

FIG. 7 is an exemplary view of an interface screen for sharing screen setting data for at least one device according to an embodiment of the present disclosure. In the proposed embodiment, an interface screen may be displayed through a display unit 430 of the second user device 400.

Referring to FIG. 7, the second user device 400 may display an interface screen 700 for downloading screen setting data for at least one device on the display unit 430.

The interface screen 700 may include a device selection area 702 for selecting at least one device to download screen setting data and a download area 704 for downloading at least one screen setting data with regard to each device.

The device selection area 702 includes graphic objects representing a smart phone, a PC, a smart TV, a smart vehicle, and advertisement screen for screen setting. The download area 704 may include a first graphic object for previewing a graphic screen based on screen setting data of each device, a second graphic object representing a name of screen setting data and a name of a manufacturer, and a third graphic object corresponding to a model selection area for selecting a model of a device to be downloaded and a download function.

For example, when a graphic object 706 representing a smart phone of the device selection area 702 is selected, the second user device 400 may display a preview image 708 for previewing a graphic screen based on screen setting data provided to set the screen of the smart phone, a text 710 representing a name of the screen setting data and a name of the manufacturer, a model selection area 712 for selecting a model of the device to be downloaded, and a download icon 714 in the download area 704.

When the user selects the graphic object 706 which represents the smart phone in the model selection area 712 and selects the download icon 714, the second user device 400 may request the service providing server 110 screen setting data corresponding to a smart phone of a selected model. In this case, the service providing server 110 may collect screen characteristic data for a smart phone of a requested model to be stored in advance. The service providing server 110 generates screen setting data for the smart phone of the requested model using the screen characteristic data and provides the generated screen setting data to the second user device 400.

When the screen setting data is received from the service providing server 110, the second user device 400 may transmit the received screen setting data to the smart phone. To this end, the second user device 400 interworks and communicates with the smart phone to set a screen of the smart phone based on the screen setting data or stores information used to transmit screen setting data to the smart phone in advance.

In various embodiments, the screen setting data may be directly transmitted to the smart phone. To this end, information used to transmit the screen setting data to the smart phone may be provided to the service providing server 110. The service providing server 110 may transmit the screen setting data to the smart phone using the information.

Therefore, the user easily transmits the screen setting data to a device interworking with the second user device to allow the device to set the screen based on the screen setting data.

In the proposed embodiment, even though an operation of downloading screen setting data for setting a screen of the smart phone through a PC has been described, when the screen setting data for a PC is downloaded, a graphic screen implemented based on the downloaded screen setting data may be displayed through a PC monitor.

In the proposed embodiment, the interface screen for downloading screen setting data is not limited to the above description and may be implemented with various configurations and designs.

As described above, according to the present disclosure, the manufacturer may more conveniently change a screen design to which the manufacturer's preference is reflected.

Further, according to the present disclosure, inconvenient of the manufacturer which needs to select a size a shape and/or a resolution of a display panel in accordance with a model of a specific device may be reduced.

According to the present disclosure, inconvenient of the manufacture which needs to separately generate screen configuration data related to a different model or a different type from that of a specific device after generating screen configuration data for the specific device may be reduced.

According to the present disclosure, a time and resources consumed to configure the screen are minimized and the convenience of screen configuration may be increased.

The apparatus and the method according to the exemplary embodiment of the present disclosure may be implemented as a program command which may be executed by various computers to be recorded in a computer readable medium. The computer readable medium may include solely a program command, a data file, and a data structure or a combination thereof.

The program commands recorded in the computer readable medium may be specifically designed or constructed for the present disclosure or those known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter.

The above-described hardware device may operate as one or more software modules in order to perform the operation of the present disclosure and vice versa.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical spirit in the equivalent scope thereto should be construed as falling within the scope of the present disclosure.

What is claimed is:

1. An apparatus for providing screen setting data of a plurality of devices, the apparatus comprising:
a communication unit configured to transmit and receive data;
a storage unit configured to store the data; and
a processor configured to be operatively connected to the communication unit and the storage unit;
wherein the processor is configured to:
receive screen configuration data from a first user device through the communication unit in order to configure a standby screen of a first model of a smart phone selected by the first user device, the screen configuration data including a background image determined by a manufacturer and at least one of an arrangement, a size, and a shape of a graphic object with regard to at least one function,
store screen setting data based on the received screen configuration data and screen characteristic data for a standard screen in the storage unit, the screen characteristic data including at least one of an average size, an average shape, and an average resolution set in advance based on at least one of a size, a shape and a resolution of a display panel in accordance with a plurality of different models of each of a plurality of smart phones,
receive a screen setting request including unique screen setting data for a second model of a smart phone, different from the first model of the smart phone, from a second user device, and
transmit screen setting data corresponding to the unique screen setting data among stored screen setting data in accordance with the screen setting request to the second model of the smart phone so that the second model of the smart phone sets the standby screen of the second model of the smart phone by using the screen configuration data corresponding to the unique screen setting data,
wherein the processor is further configured to:
compare the screen characteristic data including the at least one of an average size, an average shape, and an average resolution with the unique screen setting data including at least one of a unique size, a unique shape and a unique resolution of the second model of the smart phone,
if a difference of the screen characteristic data and the unique screen setting data is smaller than a predetermined threshold, transmit the screen setting data to the second model of the smart phone, and
if the difference is equal to or larger than the threshold, change the screen setting data based on the unique screen setting data of the second model of the smart phone.

2. The apparatus for providing screen setting data of a plurality of devices according to claim 1, wherein the processor changes the screen setting data based on unique screen characteristic data for each of the plurality of devices to generate changed screen setting data for each of the plurality of devices and stores the changed screen setting data for each of the plurality of devices in the storage unit.

3. The apparatus for providing screen setting data of a plurality of devices according to claim 1, wherein the second model of the smart phone is the second user device or another user device which interworks with the second user device.

4. A method for providing screen setting data of a plurality of devices which is performed by a processor of an apparatus for providing screen setting data of a plurality of devices, the method comprising:
receiving screen configuration data from a first user device through a communication unit in order to configure a standby screen of a first model of a smart phone selected by the first user device, the screen configuration data including a background image determined by a manufacturer and at least one of an arrangement, a size, and a shape of a graphic object with regard to at least one function;
storing screen setting data based on the received screen configuration data and screen characteristic data for a standard screen, the screen characteristic data including at least one of an average size, an average shape, and an average resolution set in advance based on at least one of a size, a shape and a resolution of a display panel in accordance with a plurality of different models of each of a plurality of smart phones;
receiving a screen setting request including unique screen setting data for a second model of a smart phone, different from the first model of the smart phone, from a second user device; and transmitting screen setting data corresponding to the unique screen setting data among stored screen setting data in accordance with the screen setting request to the second model of the smart phone so that the second model of the smart phone sets the standby screen of the second model of the smart phone by using the screen configuration data corresponding to the unique screen setting data, wherein the transmitting of screen setting data to the second model of the smart phone includes:

comparing the screen characteristic data including the at least one of an average size, an average shape, and an average resolution with the unique screen setting data including at least one of a unique size, a unique shape and a unique resolution of the second model of the smart phone, if a difference of the screen characteristic data and the unique screen setting data is smaller than a predetermined threshold, transmitting the screen setting data to the second model of the smart phone, and if the difference is equal to or larger than the threshold, changing the screen setting data based on the unique screen setting data of the second model of the smart phone.

5. The method for providing screen setting data of a plurality of devices according to claim 4, wherein the storing of the received screen setting data includes:

changing the screen setting data based on unique screen characteristic data for each of the plurality of smart phones to generate changed screen setting data for each of the plurality of devices; and storing the changed screen setting data for each of the plurality of devices in a storage unit.

6. The method for providing screen setting data of a plurality of devices according to claim 4, wherein the second model of the smart phone is the second user device or another user device which interworks with the second user device.

* * * * *